United States Patent [19]

Mercil

[11] 4,441,458

[45] Apr. 10, 1984

[54] BIRD FEEDER CONSTRUCTION

[76] Inventor: Robert A. Mercil, Star Rte., Box 315, Wetmore, Mich. 49895

[21] Appl. No.: 407,347

[22] Filed: Aug. 12, 1982

Related U.S. Application Data

[63] Continuation-in-part of Ser. No. 218,543, Dec. 22, 1980, abandoned.

[51] Int. Cl.³ ............................................. A01K 5/00
[52] U.S. Cl. .................................. 119/51 R; 119/51.5
[58] Field of Search ...................... 119/51 R, 51.5, 63, 119/52 R, 61

[56] References Cited

U.S. PATENT DOCUMENTS 2,584,301  2/1952  Sinclair ............................. 119/51.5
4,323,035  4/1982  Piltch ................................ 119/51 R Primary Examiner—Jay N. Eskovitz
Attorney, Agent, or Firm—Paul H. Gallagher

[57] ABSTRACT

A hummingbird feeder, that is usually supplied with sweet nectar and hung from above, is provided with a liquid container above it. Water, plain or containing another substance, is placed in the container, preventing ants from crawling down and reaching the feeder. The container necessarily surrounds the element suspending the feeder; the opening of the container is sufficiently large to prevent the ants from reaching the edge of the container from the suspending element, and sufficiently small to render it difficult for the birds to reach the water. In one form, the container has a funnel at the top to catch additional rain which at least partially compensates for water evaporating from the container.

3 Claims, 2 Drawing Figures

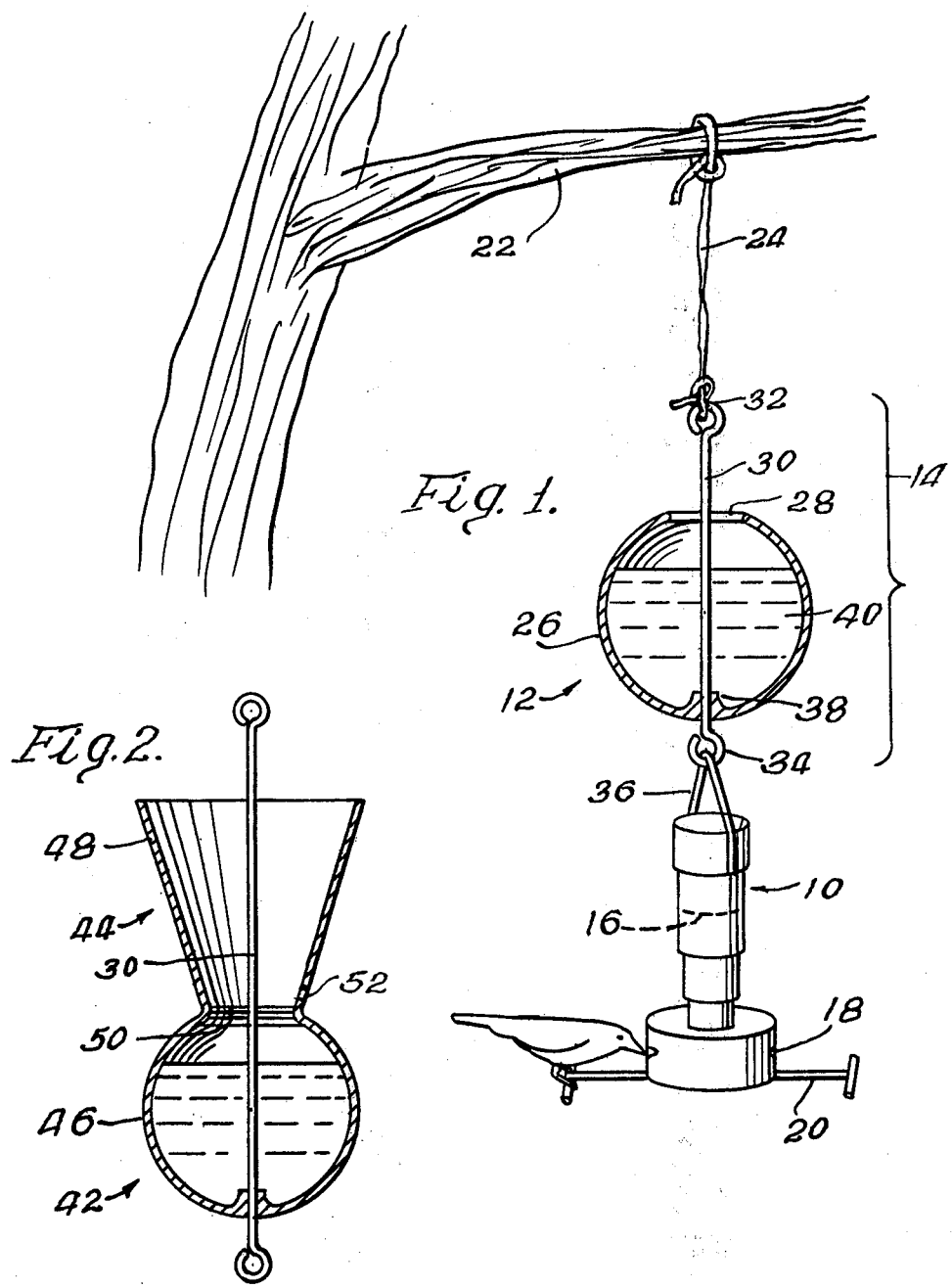

BIRD FEEDER CONSTRUCTION

This application is a continuation-in-part of my prior and copending application, Ser. No. 218,543, filed Dec. 22, 1980 now abandoned.

FIELD OF THE INVENTION

The invention resides in the field of bird feeders and particularly hummingbird feeders. Hummingbird feeders are ordinarily supplied with a sweet liquid or nectar, and ants find their way to the feeder, generally in great numbers, and become a great nuisance, discouraging the birds. The feeders are often hung from a tree or other overhead member, free from contact laterally with other objects, in an effort to prevent ants from going to the feeders, but nevertheless they find their way to the supporting member and crawl down the string or wire that supports the feeder.

OBJECTS OF THE INVENTION

A broad object of the invention is to provide a bird feeder construction for hummingbirds, effective for preventing ants and other insects from crawling onto the feeder.

A more specific object is to provide a bird feeder and means for suspending it from an overhead support, wherein:

(1) A liquid container is provided above the feeder, mounted on the means supporting the feeder, which discourages any ants that crawl down the supporting means, from crossing the liquid and crawling down to the feeder.

(2) The liquid container is so shaped and constructed as to prevent or discourage birds from drinking therefrom.

(3) The container, in at least one form of the invention, is shaped to collect rain water to compensate for evaporation of water therefrom.

(4) The container, in the form for collecting rain water, is provided with an overflow hole to drain off excess rain water collected.

DESCRIPTION OF PREFERRED EMBODIMENTS

In the drawings:

FIG. 1 shows a bird feeder construction of the invention in position mounting a hummingbird feeder on an overhead support; and FIG. 2 shows a modified form of liquid container.

Referring in detail to the drawings, a hummingbird feeder 10 of known kind is suspended from an overhead support, and the bird feeder construction of the present device is indicated in its entirety at 12, this construction occupying the vertical range indicated by the bracket 14. The bird feeder 10 is usually supplied with a sweet liquid or nectar indicated at 16, which feeds down to an opening 18 at the perch 20.

It has always been the custom to support a hummingbird feeder from an overhead support, away from contact laterally with other objects, to prevent other wild life from reaching the feeder. The particular support on which it is mounted may be of any kind, but the feeder is usually hung in the trees to more readily attract the hummingbirds. In the present case such a tree is indicated at 22 and the feeder is supported or suspended by an element 24 which may be a wire or string. Heretofore the wire 24 was usually secured directly to the bird feeder.

Despite the fact that the bird feeder would be suspended solely from an overhead support, and out of contact laterally with other objects, wild life would find its way to the feeder. The most common example of such wild life is ants. Ants would find their way from the tree down the suspending element 24 to the feeder, and become a great nuisance, discouraging the birds from approaching the feeder and otherwise being distractive.

The bird feeder construction 12 of the present invention prevents the ants from reaching the bird feeder. The feeder construction 12 includes a container 26 preferably cup-shaped, and bulbous with a reduced or constricted top opening 28. The container 26 is mounted on a supporting element 30 which is preferably a rigid wire having loops 32 and 34 at its ends. The wire 24 is secured to the top loop 32, and a bail 36 which may be a wire, string, etc. is secured to the bird feeder proper and to the loop 34.

The container 26 receives the supporting element 30 through the open top, and it passes through the wall of the container at 38 in water tight engagement therewith, by means of any convenient and known construction. The container 26 may be of any known or suitable material, such as metal, plastic, rubber, etc. The reference numeral 40 indicates water, which may be plain or with another substance added to it, as referred to below.

The opening 28 is of such dimension as to prevent ants from crossing from the supporting element 30 to the edge of the container wall, this distance possibly being different in view of different kinds of insects, the precise dimensions of which may be determined according to circumstances. Additionally, this distance is such as to discourage the birds from perching on the edge of the wall and reaching into the interior and drinking the water.

The bulbous shape of the container 26 as shown in FIG. 1, referred to, need not be any particular shape, but may vary according to preferences. Given the maximum transverse dimension or diameter of the opening 28, the container could extend straight down, in the form of a cylinder, but the bulbous shape is preferred for containing a greater quantity of water and for appearance sake. The shape and dimensions are of course variable within a wide range.

FIG. 2 shows a bird feeder construction of modified form, relative to that of FIG. 1. It contains the supporting element 30, and a container 44 which includes a main bottom portion 46 and an upper portion 48 which diverges upwardly, in the shape of a funnel. The main bottom portion 46 is of bulbous form, terminating upwardly in a constriction 50 similar in dimension to the opening 28 of FIG. 1 and the upper funnel portion 48 is effective for catching a greater amount of rain. In the case of the construction of FIG. 2, if the birds should rest on the upper edge of the portion 48 and attempt to drink the water, they will have difficulty in reaching the water due to the greater depth. As water in the container evaporates, normally the person keeping the bird feeder would replace it, but in this case, the greater quantity collected by means of the funnel portion 48 will compensate for such evaporation. The water thus collected flows into the bottom portion 46, but in the case of heavy or persistent rain, the upper funnel portion 48 would fill or at least partially so. To prevent this event, an overflow hole 52 is provided in the funnel portion, preferably just above the lower portion 46, enabling the water to run out of the funnel portion. The hole may be of any suitable shape and size. This then prevents birds from drinking from the device, since they cannot reach down into the lower portion.

The bird feeder construction, either that of FIG. 1 or that of FIG. 2, is made of the desired size and capacity for containing a sufficient quantity of water, effective to the extent possible to last a desired period without replenishment between the ordinary cleanings of the feeder, in which of course a new quantity of water is replaced therein at that time.

Ants in being attracted to the sweet nectar in the bird feeder, in crawling down the mounting elements 24, 30 are thus prevented from doing so, and will then return upwardly.

Plain water is found to be effective for the purpose, but it is within the scope of the invention to use other substances therein for discouraging the birds from attempting to drink it. Various substances may be used, including for example insect repellents approved by the EPA (Environmental Protection Agency).

I claim:

1. In a hummingbird feeder construction including a bird feeder and a bail thereabove for securing it to an overhead support, the improvement comprising, a cup-shaped container containing a liquid, having a top opening of reduced transverse dimensions relative to the main portion of the container,
   a supporting element extending through the bottom wall of the container, and having means at its upper end for connection with a supporting means and means at its lower end for connection with said bail, and the supporting element being thereby operable, to the exclusion of the container, for entirely supporting the feeder,
   the top opening being sufficiently large to prevent ants from reaching the margin of the opening from the supporting element, and being sufficiently small to prevent a bird as small as a hummingbird from reaching therethrough and drinking liquid from the container.

2. A bird feeder construction according to claim 1 wherein, the container has a main bottom part terminating upwardly in a predetermined transverse dimension defining said opening, and an upper part diverging upwardly defining a funnel for catching rain.

3. A bird feeder construction according to claim 2 wherein, the upper part includes an overflow hole adjacent the bottom part.

* * * * *